US005673850A

United States Patent [19]
Uptegraph

[11] Patent Number: 5,673,850
[45] Date of Patent: Oct. 7, 1997

[54] PROGRAMMABLE THERMOSTAT WITH ROTARY DIAL PROGRAM SETTING

[75] Inventor: Greg S. Uptegraph, Clementon, N.J.

[73] Assignee: Lux Products Corporation, Mt. Laurel, N.J.

[21] Appl. No.: 681,212

[22] Filed: Jul. 22, 1996

[51] Int. Cl.⁶ .................... F24F 7/00; F25B 19/00
[52] U.S. Cl. ........................ 236/46 R; 165/268
[58] Field of Search .................... 236/46 R, 47; 165/267, 268; 62/231

[56] References Cited

U.S. PATENT DOCUMENTS

| | | | |
|---|---|---|---|
| 3,929,284 | 12/1975 | Prewarski et al. | 165/268 X |
| 4,206,872 | 6/1980 | Levine | 165/268 X |
| 4,837,731 | 6/1989 | Levine et al. | |

*Primary Examiner*—William E. Wayner
*Attorney, Agent, or Firm*—Austin R. Miller

[57] ABSTRACT

The invention is directed towards a programmable thermostat which includes a programming device for generating programs and a temperature comparison device to operate a temperature-modifying device, such as a furnace or air-conditioning system. This programming device may include a microprocessor which is capable of generating at least one weekday program and weekend program. The programming device of the present invention is also capable of generating a signal indicative of at least the current time of day, which signal can be used by the programming device in establishing its programs. The present invention also includes a rotatable, settable controller which controls the operation of the programming device. The rotatable controller includes a position for setting at least one weekday program, setting at least one weekend program, setting the current time, and controlling the temperature-modifying device. Additionally, the thermostat of the present invention may include an outer casing which has a door pivotably attached thereto which covers the rotatable controller. This door has protrusions on its inner surface which are arranged to prevent the door from closing unless the rotatable controller is set to operate the thermostat.

10 Claims, 6 Drawing Sheets

PROGRAMMABLE THERMOSTAT WITH ROTARY DIAL PROGRAM SETTING

Field of the Invention

The field of the present invention is that of programmable thermostats for controlling a heating and/or cooling system to maintain predetermined set point temperatures, and more particularly to programmable thermostats which have multiple program settings.

BACKGROUND OF THE INVENTION

It has been a longstanding problem in the heating and cooling of homes and offices to efficiently regulate the ambient temperature to maintain the desired comfort level, while minimizing the amount of energy expended by the heating/cooling apparatus. The heating/cooling needs of a home or office are not constant over time and may, in fact, vary substantially depending on the time of day or day of the week. Conventional thermostats have been highly inefficient in this regard due to the fact that only one set temperature could be maintained.

In response to this, programmable thermostats were developed in the prior art which allowed for the programming of multiple set points for the thermostat based upon the time of day or day of the week. Many of these prior art programmable thermostats utilize a microprocessor into which the user inputs the desired temperature setting information by way of a keypad or complex arrangement of buttons and switches. Examples of such programmable thermostats can be found in U.S. Pat. Nos. 4,335,847 and 4,837,731, the disclosures of which are hereby incorporated by reference.

However, these prior art thermostats have the distinct disadvantage that they are cumbersome to program and are complicated to use. This often results in an improper setting of the thermostat and, consequently, an inefficient use of the heating/cooling apparatus.

Moreover, it often occurs that the users are unaware that they have improperly programmed the thermostat or that they have not finished the programming of the thermostat. Again, this results in an improper setting of the thermostat and inefficient use of the heating/cooling apparatus.

Therefore, a programmable thermostat is needed which allows users to easily create multiple programs for various set point temperatures, while simultaneously assuring individuals that they have programmed the thermostat correctly and have, in fact, controlled the thermostat to its desired operating condition.

OBJECTS OF THE INVENTION

It is therefore an object of the invention to provide a programmable thermostat which has multiple program settings and which is easy to use.

It is also an object of the invention to provide a programmable thermostat which intuitively allows better organization of programming tasks.

It is another object of the invention to provide a programmable thermostat having weekday and weekend program(s) in which each day may be programmed individually, yet easily, by the user.

It is a further object of the invention to provide a programmable thermostat which utilizes a rotatable control device to allow the user to easily change between setting the weekday program, setting the weekend program(s), setting the date/time of day, and setting the thermostat to its run position.

Further objects of the invention will be clear to those of ordinary skill in the art from the embodiments of the invention disclosed herein and in the appended claims.

SUMMARY OF THE INVENTION

The objectives of the present invention are achieved by providing a programmable thermostat for the control of the temperature of a medium which includes a comparison device for comparing the existing temperature with a desired temperature and a programming device for generating programs to control the thermal output of a temperature-modifying device, such as a furnace or air-conditioning system. This programming device may include a microprocessor which is capable of creating at least weekday program and weekend programs, or possibly weekday, Saturday, and Sunday programs. The present invention also includes a rotatable, settable controller which controls the programming device. The rotatable control device may have a plurality of function positions, such as setting a weekday program, setting one or more weekend programs, setting the current time, setting or checking a usage counter, and operating the thermostat.

Additionally, the thermostat of the present invention may include an outer casing having a pivotable door which covers the rotatable control device. This door has protrusions on its inner surface which are arranged to prevent the door from closing unless the rotatable control device is set to operate the thermostat.

DESCRIPTION OF THE PREFERRED EMBODIMENT

Although the present invention will be hereinafter described in regard to specific embodiments thereof, these embodiments are provided merely for illustration and explanation of the invention, which is not limited thereto but only as defined in the appended claims.

Figure 1:
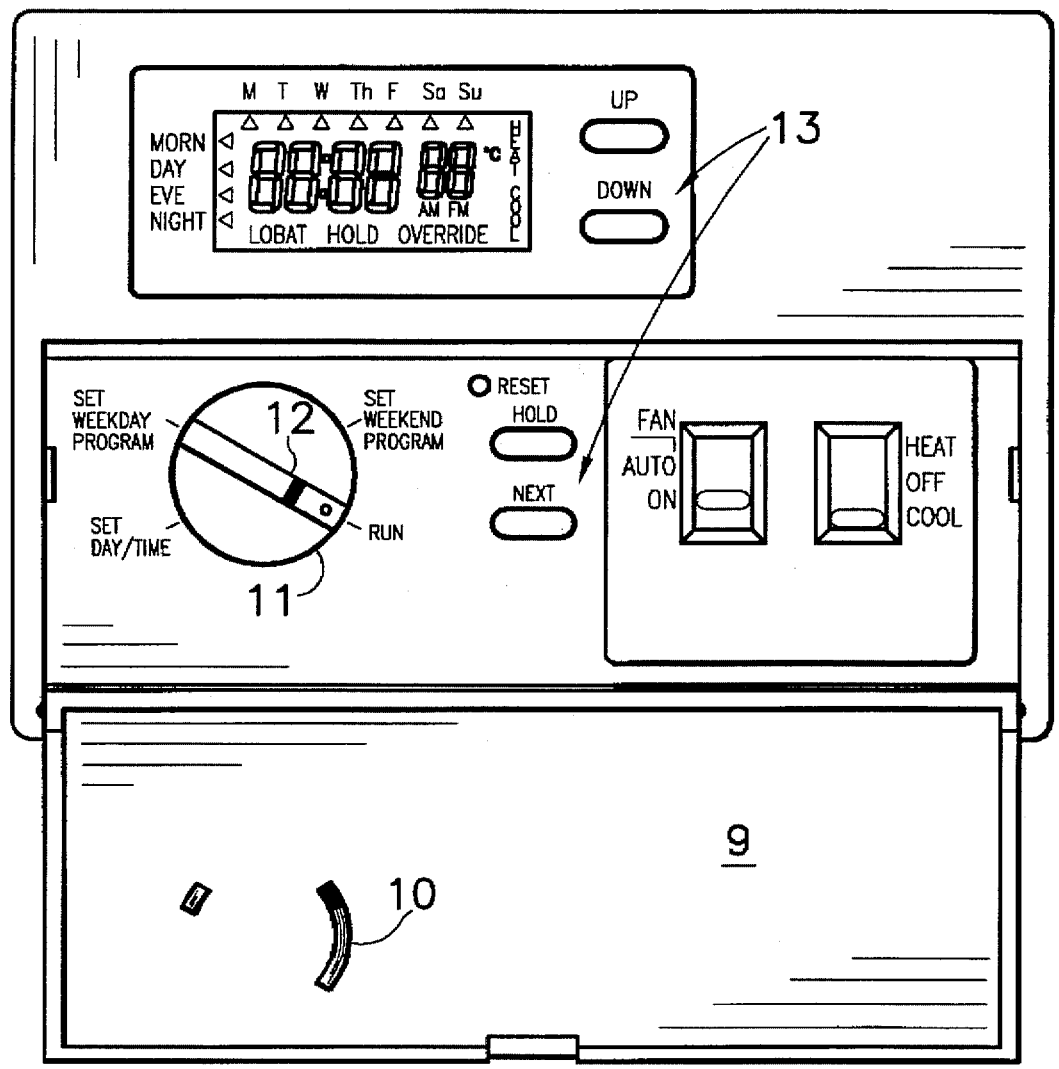
FIG. 1 is a drawing of one embodiment of a programmable thermostat according to the present invention which has a closeable door on its front face.
Figure 2:
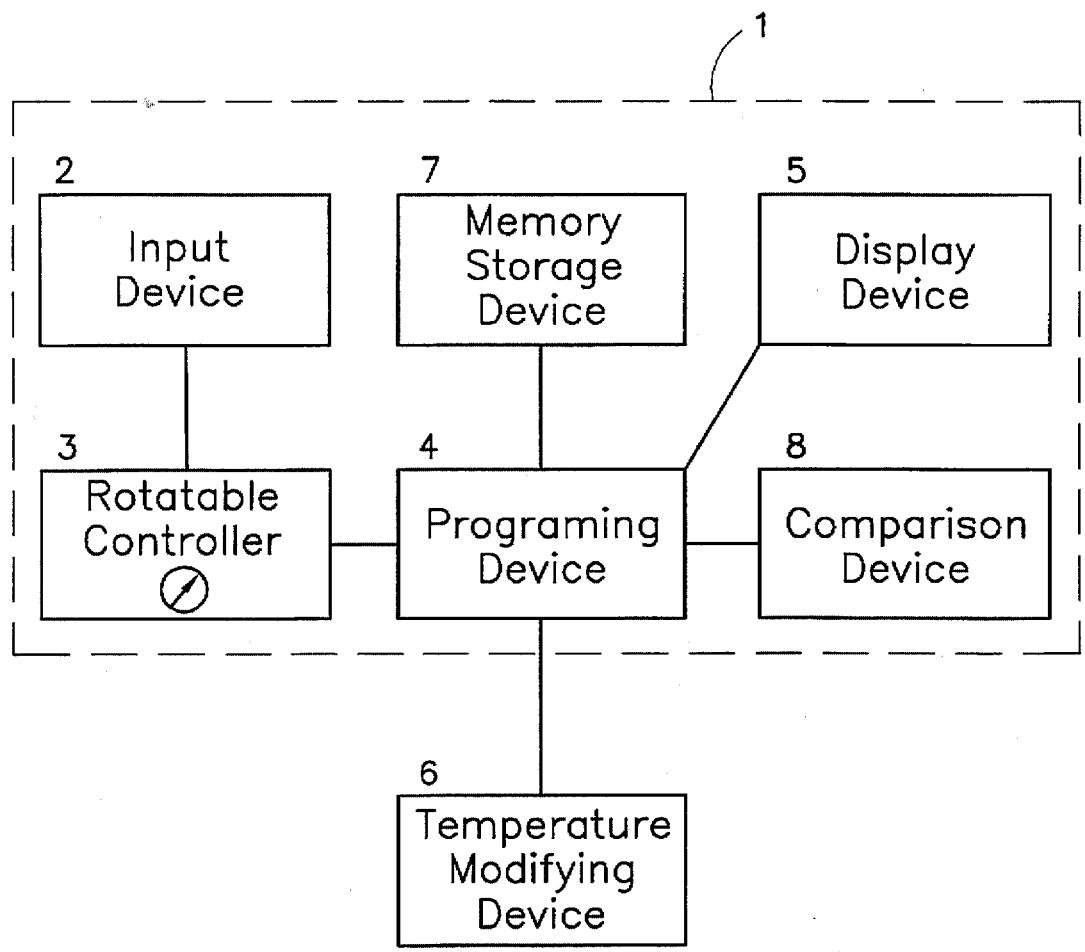
FIG. 2 is a block diagram of the operation of a programmable thermostat according to the present invention.

FIG. 1 is a drawing of a preferred embodiment of the present invention. FIG. 2 contains a block diagram of the preferred embodiment of the invention. Information regarding the desired set point temperature, date, or time for each program is inputted to the thermostat 1 by the user through input device 2. Input device 2 is connected to rotatable, settable controller 3 in such a way that the information inputted by the user is used to perform the appropriate function defined by the position of rotatable controller 3. Programming device 4, which is connected to rotatable controller 3, receives the information inputted at input device 2, and displays this information on display device 5. Programming device 4 also controls the operation of the temperature control device 6, and stores the information in memory storage device 7. Comparison device 8 compares the ambient temperature with the desired temperature, as determined by programming device 4 and stored in memory storage device 7.

As shown in FIG. 1, rotatable controller 3 may comprise rotatable dial 11 having positions for setting at least one weekday program, at least one weekend program, date/time, and running or operating the thermostat. Optionally, rotatable controller 3 may include a position to allow the operator to set and check the length of use of filters or other devices in the temperature modifying device. This could be accomplished, for example, by using a usage counter contained in programming device 4. Rotatable controller 3 may also have separate positions for setting a Saturday and a Sunday program, as shown in FIG. 4.

Figure 3A:
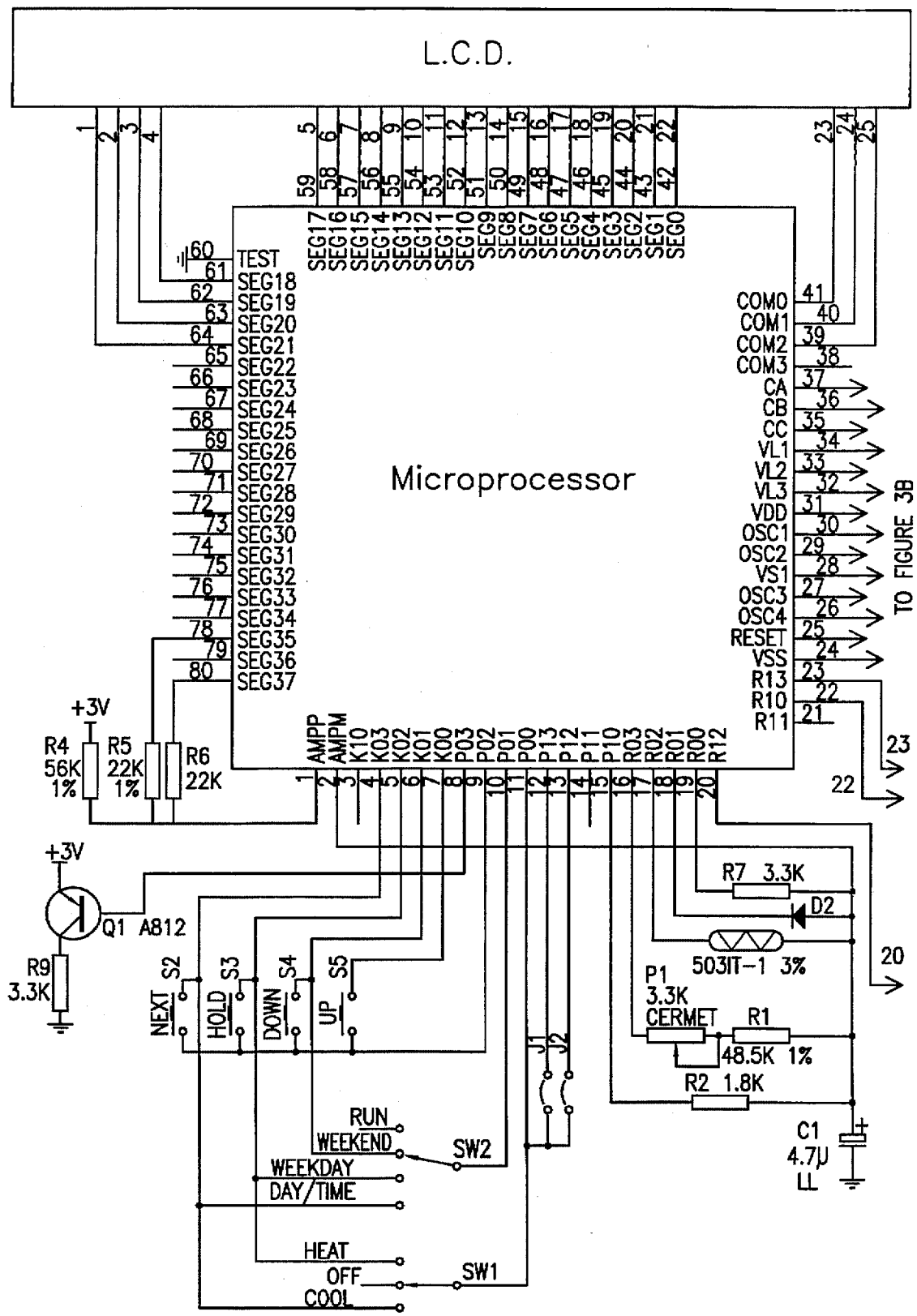
FIGS. 3a and 3b are a schematic diagram of a preferred embodiment of the present invention.
Figure 3B:
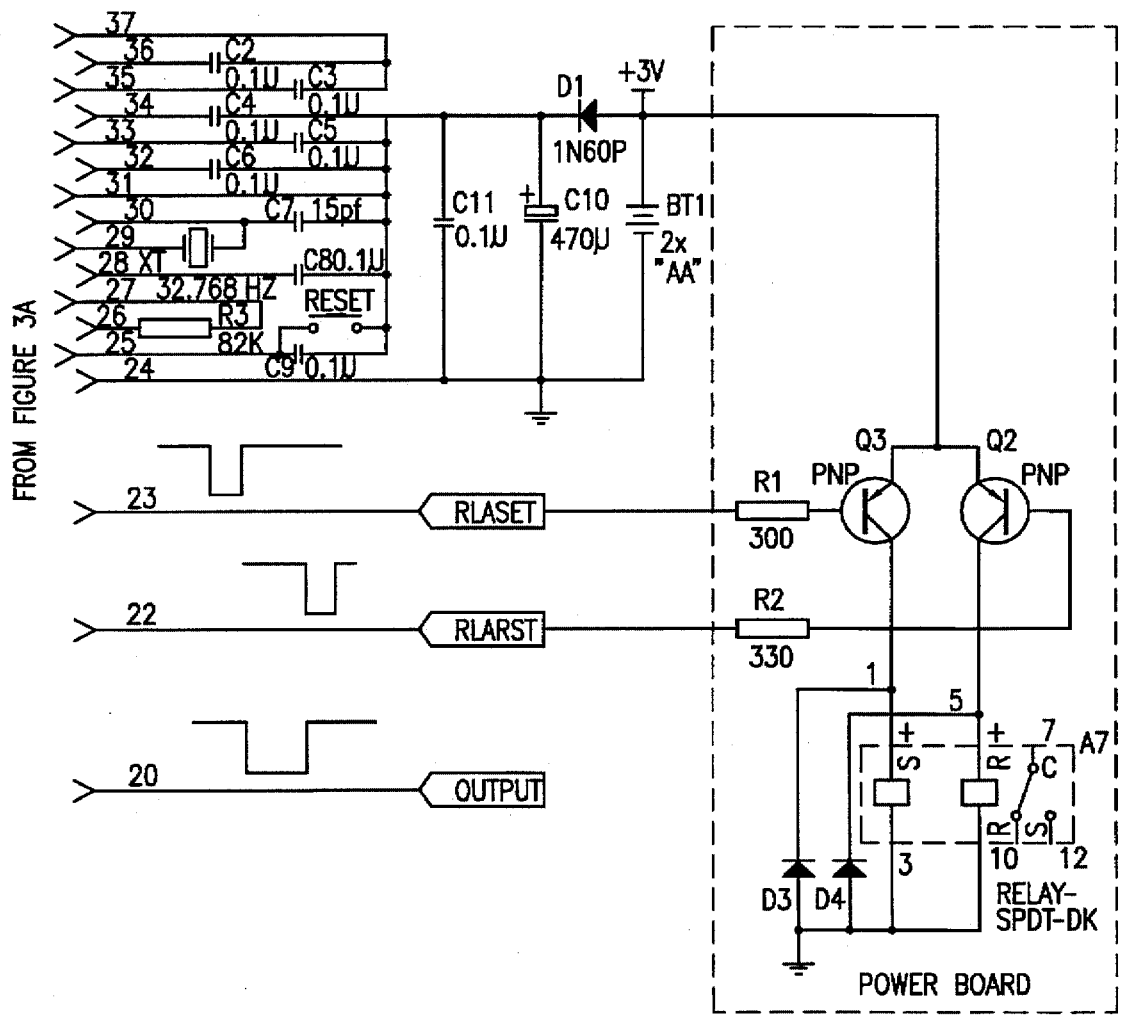
Figure 4A:
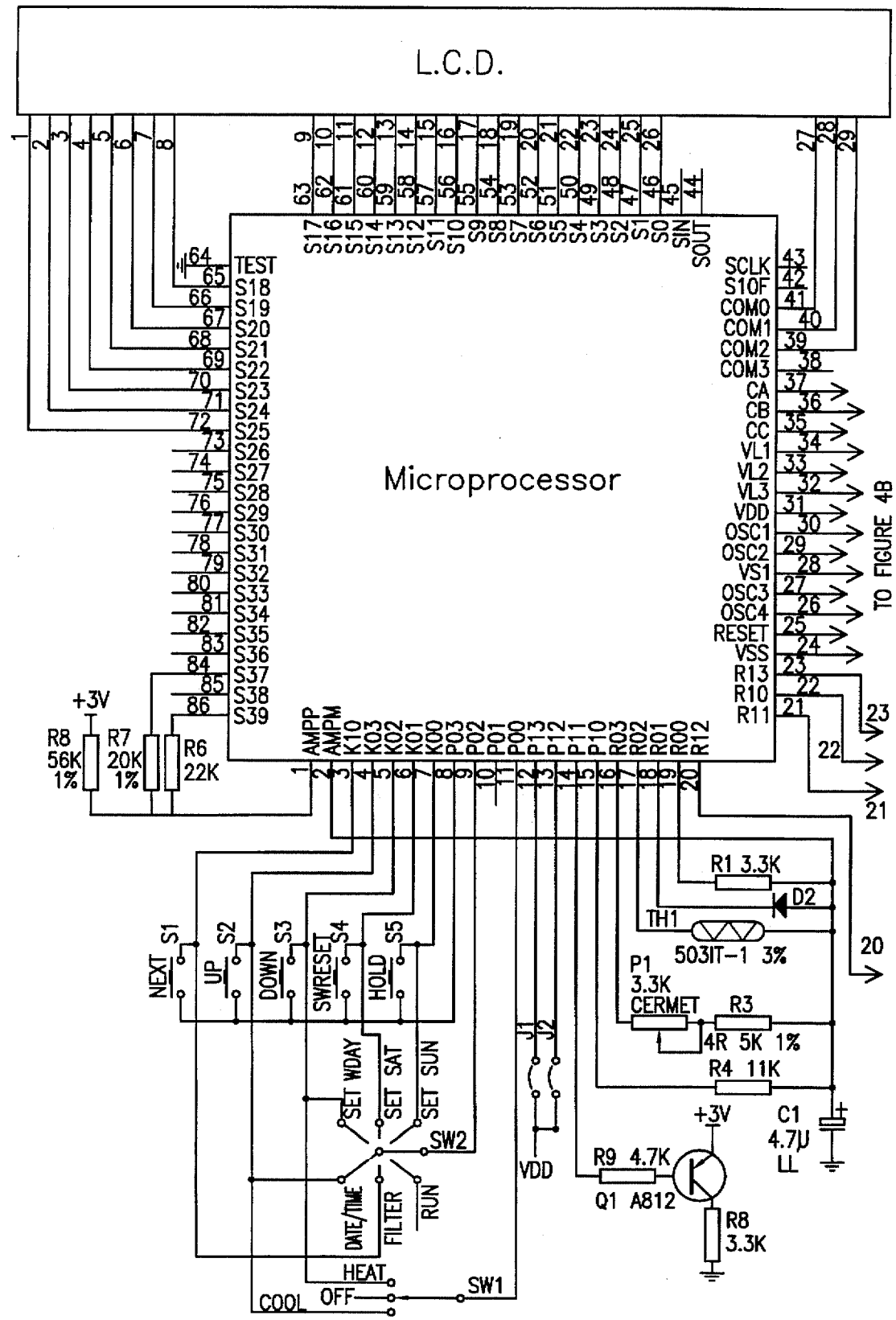
FIGS. 4a and 4b are a schematic diagram of another embodiment of the present invention.
Figure 4B:
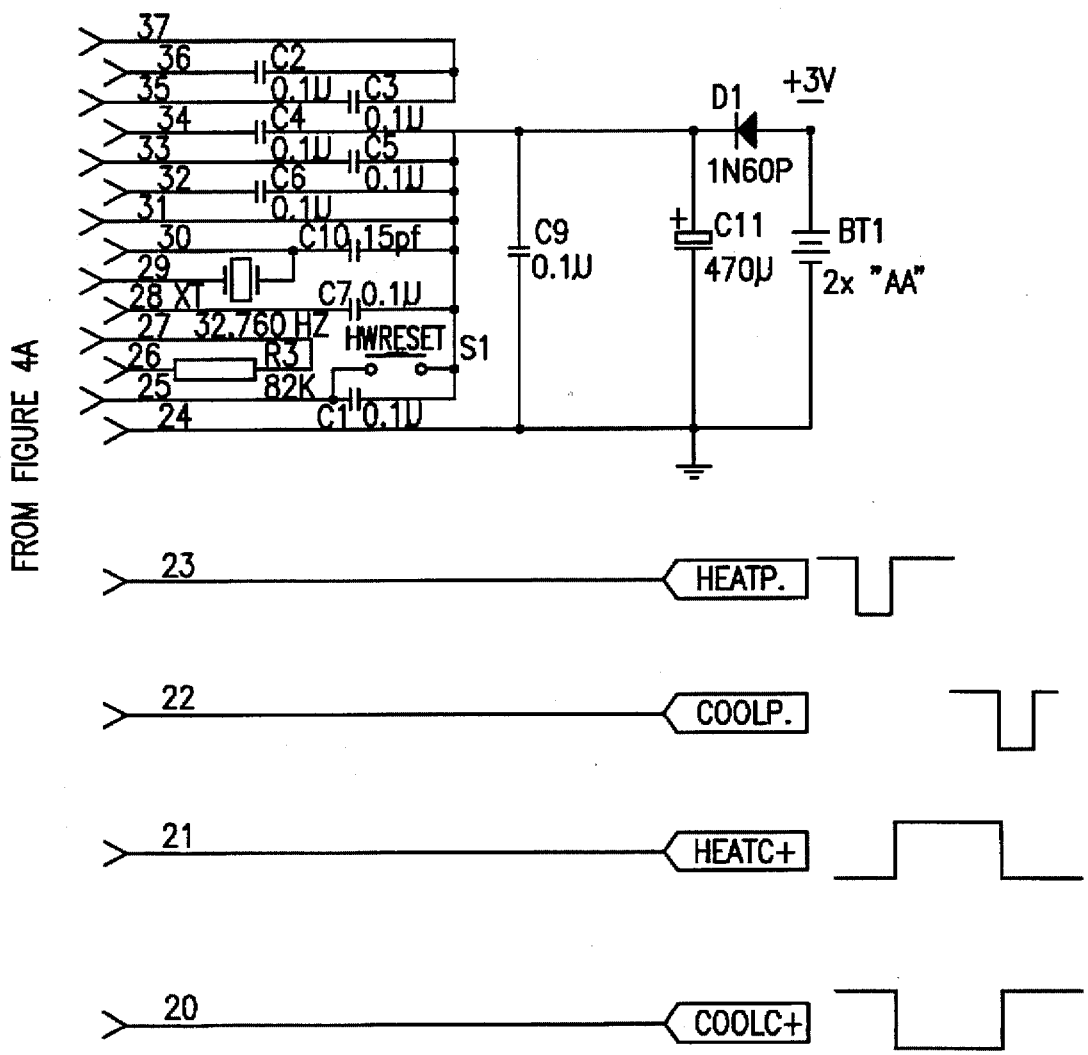

The input device may include pressure sensitive buttons 13, a keypad, or any other device or arrangement of devices which are capable of entering the appropriate information for each program, as illustrated in FIGS. 1, 3 and 4. Examples of such input devices are known to those of ordinary skill in the art.

By moving rotatable dial 11 to one of the setting positions, the thermostat user can enter data via the pressure sensitive buttons. This information is used by programming device 4 to generate the appropriate program. This may be accomplished, for example, by use of a rotatable contact switch having its electrical connections configured such that the information inputted at the pressure sensitive buttons is associated with the correct function in the microprocessor.

The use of a rotatable controller provides significant advantages over conventional programmable thermostats in providing for an intuitive separation of programming functions which, in turn, allows the user to better organize his/her operation of the thermostat. Although a preferred embodiment of the rotatable controller of the invention is shown in FIG. 1, other equivalent devices will be apparent to those of ordinary skill in the art.

FIGS. 3 and 4 are schematics showing preferred embodiments of the invention utilizing a microprocessor. As illustrated in these figures, programming device 4 may comprise a microprocessor or other similar integrated circuit device. The microprocessor receives the information inputted at the contact switches, as shown in FIGS. 3 and 4, and establishes the correct program, depending on the setting of rotatable controller 3. The microprocessor may also correct the date and time based on inputted information. If rotatable controller 3 is set to run the thermostat, then information inputted at input device 2 is ignored by the microprocessor.

The microprocessor may also incorporate a settable/resettable counter, known to those in the art, for determining usage of the temperature-modifying device. The usage counter would also be set or reset by the microprocessor with information inputted at input device 2.

The microprocessor of programming device 4 may display the inputted information on a display device 5, such as an LCD display, as shown in FIGS. 1, 3 and 4. This is achieved in a conventional manner, known to those of ordinary skill.

The microprocessor of programming device 4 may store new programs, the current date and time, and the usage count in memory storage device 7. Memory storage device 7 may comprise a programmable, memory chip or other similar integrated device typically used for storing such information. Memory storage device 7 may be integrated with the microprocessor, as in the embodiments shown in FIGS. 3 and 4.

Programming device 4 may also control temperature modifying device 6 when rotatable controller 3 is set to the run position. Temperature modifying device 6 may comprise a furnace or air conditioning system, a heating ventilation and air conditioning ("HVAC") system, or any other temperature modifying device. These are not shown.

Comparison device 8 detects the current ambient temperature by using a conventional temperature sensing device, such as a thermistor, thermocouple, or other type of temperature transducer. These are known to those in the art. After detecting the ambient temperature, comparison device 8 compares it with the desired temperature based upon the program stored in memory storage device 7 by programming device 4. In the embodiment shown in FIGS. 3 and 4, the microprocessor performs this comparison function. Ambient temperature is detected by thermistor TH1.

A variety of programming and comparing devices may be used, known to those in the art. Some of these are described in U.S. Pat. No. 5,038,851; 4,071,745, and 4,771,392, the contents of which are specifically incorporated by reference herein.

In the embodiment of the invention shown in FIG. 1, the invention also includes a pivotable cover 9 attached to the thermostat's outer casing. This cover may contain protrusions 10 which are arranged such that they prevent the cover from closing if rotatable dial 11 is not in the run position. For example, in the embodiment of the invention shown in FIG. 1, rotatable dial 11 includes elongated handle 12, having a beveled edge at one end. Protrusions 10 are configured so that when the beveled edge of elongated handle 11 is turned to the run position, it is aligned with a corresponding beveled edge on protrusions 10, allowing pivotable cover 9 to close.

The use of a rotatable control device allows the user to easily and simply set the current date and/or time, set a weekday program, set one or more weekend programs, check filter usage, or operate the thermostat. The rotatable dial allows for an intuitive separation of programming functions which, in turn, allows the user to better organize his or her programming of the thermostat. For example, the invention may be easily and efficiently operated in the following manner:

TO SET TIME & DAY:

Turn the rotatable dial to SET DAY/TIME,

Press UP to change current day,

Press NEXT,

Press UP/DOWN to set time,

Rotate the dial to the RUN position

Close the pivotable door.

TO SET PROGRAMS:

Turn the rotatable dial to SET WEEKDAY PROGRAM or SET WEEKEND PROGRAM,

Press UP/DOWN to adjust start time,

Press NEXT,

Press UP/DOWN to adjust temperature,

Press NEXT,

Repeat as needed or turn the rotatable dial to RUN to stop programming.

These unique aspects of the invention provide significant advantages over conventional programmable thermostats which utilize a complicated series of buttons or switches or which require a user to input a series of complicated keypad instructions in order to set the various programs. In sharp contrast, the present invention allows the user to easily and more efficiently enter the appropriate information.

Additionally, the use of appropriately arranged protrusions on the pivotable cover ingeniously prevents the thermostat user from mistakenly believing that the programming operation is complete and that the thermostat is in the run position. This is not possible with conventional keypads controller and other prior art systems.

While the invention as disclosed herein has been described in relation to specific embodiments thereof, it is understood that the invention is not limited to the particular embodiment disclosed herein, but only as set forth in the appended claims. It will be appreciated that various components known to those of skill in the art may be substituted for those described herein without departing from the spirit and scope of the invention as set forth in the appended claims. For example, the input device may include a pressure keypad or a series of contact switches instead of the pressure switches disclosed herein. The display device may also include an LED display or other illuminated display mechanisms, or any of a number of conventional mechanical display mechanisms such as gauges or the like.

What is claimed is:

1. A programmable thermostat for the control of the temperature of a medium within a space by utilizing a temperature-modifying device, said programmable thermostat comprising:

(a) comparison means for comparing an existing temperature of said medium within said space to a temperature desired to be achieved of said medium in said space, (b) a programming means connected for generating a program to control a thermal output of said temperature-modifying device to achieve said desired temperature, (c) an input means connected for inputting information to said programming means, (d) a memory storage means connected for storing information received from said programming means, (e) a display means connected to said programming means for displaying information contained by said programming means, and (f) a rotatably settable controller connected for controlling said programming means, said controller comprising:
(i) a position for setting at least one weekday program,
(ii) a position for setting at least one weekend program,
(iii) a position for setting the current time, and
(iv) a position for controlling said temperature-modifying device, wherein said programming means is connected to receive said information inputted into said input means and performs said function defined by said position of said controller.

2. The programmable thermostat of claim 1, further comprising:

an outer casing for said thermostat, a pivotable door attached to said outer casing, said pivotable door having protrusions formed thereon, wherein said protrusions are arranged to prevent said pivotable door from being closed against said outer casing unless said controller is set in said position for controlling said temperature modifying device.

3. The programmable thermostat of claim 1, wherein said programming means, said comparison means, and said memory storage means comprise an integrated circuit having a microprocessor and a programmable memory chip.

4. The programmable thermostat of claim 1, wherein said display means comprises an LCD display.

5. A programmable thermostat for the control of the temperature of a medium within a space by utilizing a temperature-modifying device, said programmable thermostat comprising:

a programmable microprocessor connected for comparing an existing temperature of said medium to a temperature desired to be achieved of said medium, and controlling a thermal output of said temperature-modifying device to achieve said desired temperature of said medium, a memory storage means connected for storing information received from said microprocessor, an input means connected for inputting information to said microprocessor, said input means comprising a plurality of switches, a display means connected for displaying information processed by said microprocessor, and a rotatably, settable controller connected for controlling said microprocessor, said controller comprising:
(i) a position marked for setting at least one weekday program,
(ii) a position marked for setting at least one weekend program,
(iii) a position marked for setting the current time, and
(iv) a position marked for operating said thermostat, wherein said microprocessor receives said information inputted into said input means and performs said function defined by said position of said controller.

6. The programmable thermostat of claim 5, wherein said memory storage means is a programmable memory chip.

7. The programmable thermostat of claim 5, wherein said display is an LCD display.

8. A programmable thermostat for the control of the temperature of a medium within a space by utilizing a temperature-modifying device, said programmable thermostat comprising:

(a) comparison means for comparing an existing temperature of said medium within said space to a temperature desired to be achieved of said medium in said space, (b) a programming means connected for generating a program to control a thermal output of said temperature-modifying device to achieve said desired temperature, (c) an input means connected for inputting information to said programming means, (d) a memory storage means connected for digitally storing information received from said programming means, (e) a display means connected to said programming means for displaying information contained by said programming means, and (f) a rotatably settable controller connected for controlling said programming means, said controller comprising:
(i) a position marked for setting at least one weekday program,
(ii) a position marked for setting at least one weekend program,
(iii) a position marked for setting the current time, and
(iv) a position marked for operating said thermostat, wherein said programming means is connected to receive said information inputted into said input means and performs said function defined by said position of said controller, and an outer casing for said thermostat having a pivotable cover attached thereto, said cover having protrusions formed thereon, wherein said protrusions prevent said pivotable cover from closing against said outer casing unless said controller is set in said position for operating said thermostat.

9. The programmable thermostat of claims 1, 5, or 8, wherein said rotatably settable controller comprises separate positions for setting a Saturday program and for setting a Sunday program.

10. The programmable thermostat of claims 1, 5, or 8, wherein said rotatably settable controller further comprises a position for setting a usage counter.

* * * * *